United States Patent [19]
Young

[11] 3,912,456
[45] Oct. 14, 1975

[54] APPARATUS AND METHOD FOR AUTOMATIC CHEMICAL ANALYSIS

[75] Inventor: Robert R. Young, Anaheim, Calif.

[73] Assignee: Anatronics Corporation, Anaheim, Calif.

[22] Filed: Mar. 4, 1974

[21] Appl. No.: 447,958

[52] U.S. Cl. .............. 23/253 R; 23/230 R; 23/259; 73/425.6
[51] Int. Cl.² .................. G01N 33/16; G01N 1/14
[58] Field of Search ...... 23/230 R, 253 R, 292, 259; 141/130; 73/425.4 R, 425.6; 134/22 R

[56] References Cited
UNITED STATES PATENTS

| | | | |
|---|---|---|---|
| 3,192,968 | 7/1965 | Baruch | 23/253 |
| 3,594,129 | 7/1971 | Jones | 23/253 |
| 3,680,967 | 8/1972 | Engelhardt | 23/253 X |
| 3,788,816 | 1/1974 | Rohrbaugh et al. | 23/253 |
| 3,814,582 | 6/1974 | Rohrbaugh et al. | 23/253 X |

Primary Examiner—R. E. Serwin

[57] ABSTRACT

Aspirator and dispenser arms are rotatably mounted on a center tube assembly above a main platform containing fluid specimens to be analyzed and the various receptacles in which the specimens are mixed with reagents and inspected. Means included in the aspirator and dispenser arms transport and meter the fluids in the desired sequence. A wash system cleans and dries the fluid transport means and the various containers after each exposure to a reagent or specimen. A detection arm radially mounted below the main platform includes an optical reader for identifying randomly positioned, pre-labeled specimens, and diagnostic equipment for examining the samples. All operations are automatically timed and sequenced by an electronic control and printer linked to the analyzer hardware to permit random positioning of specimens and random feeding of test instructions.

26 Claims, 20 Drawing Figures

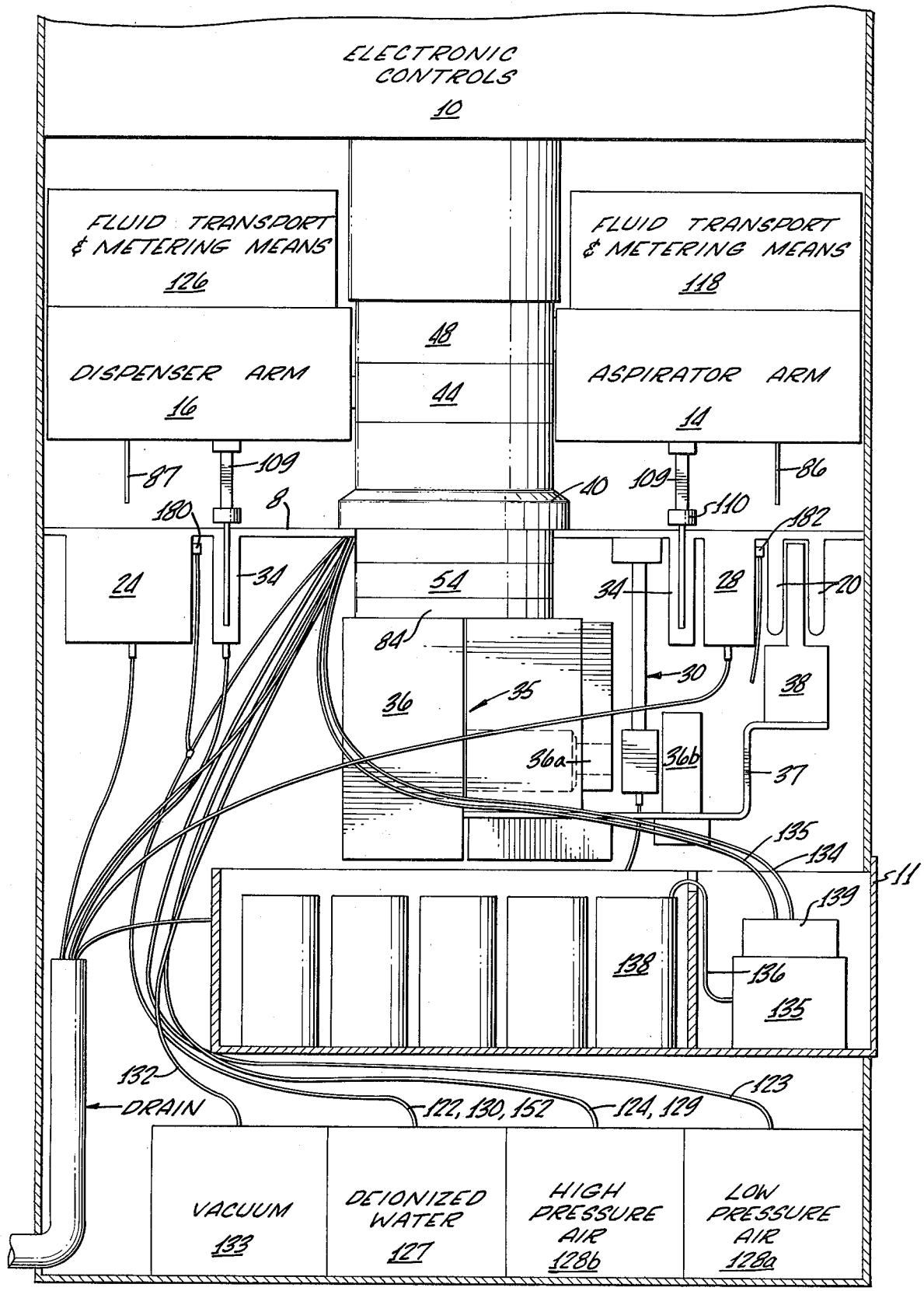

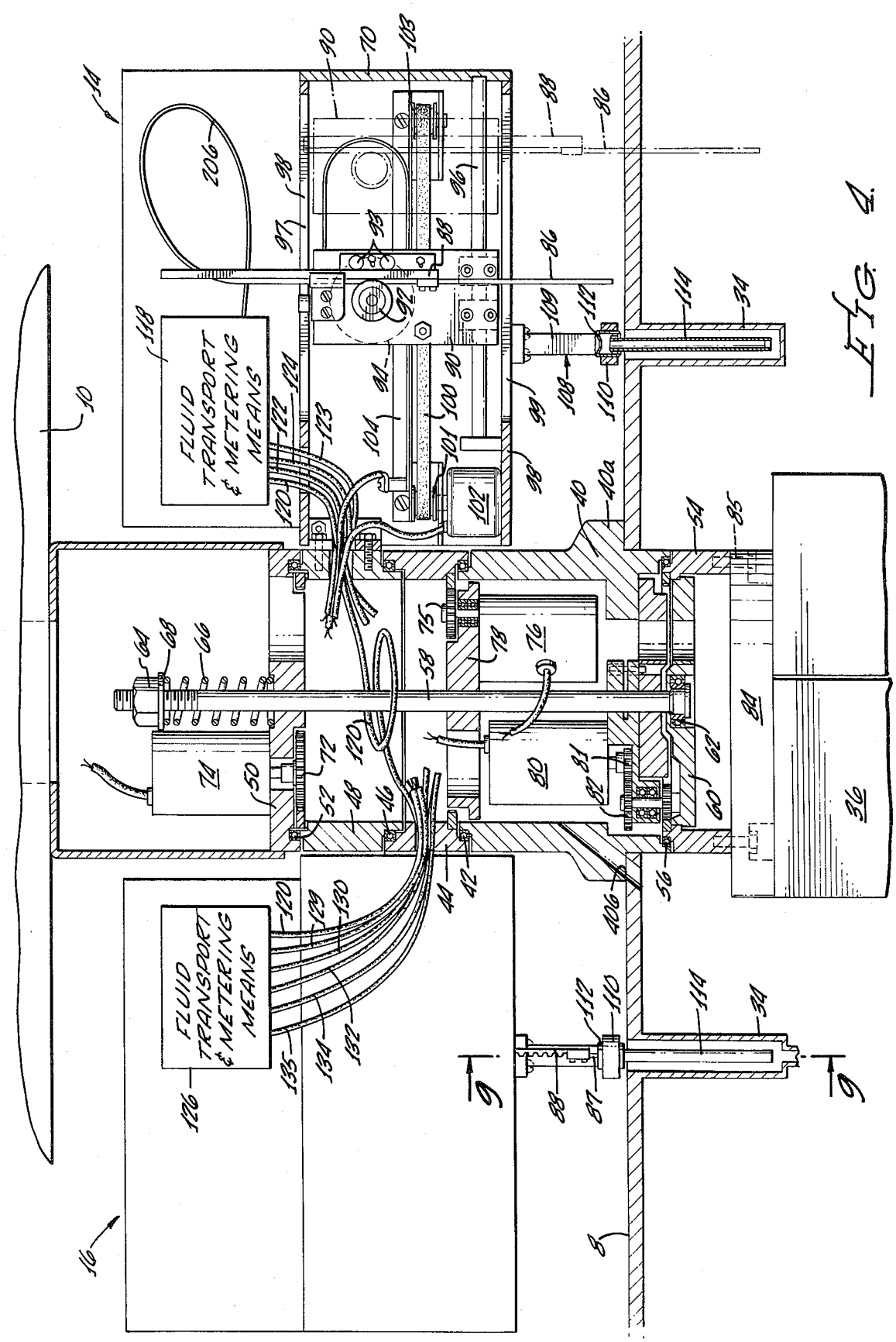

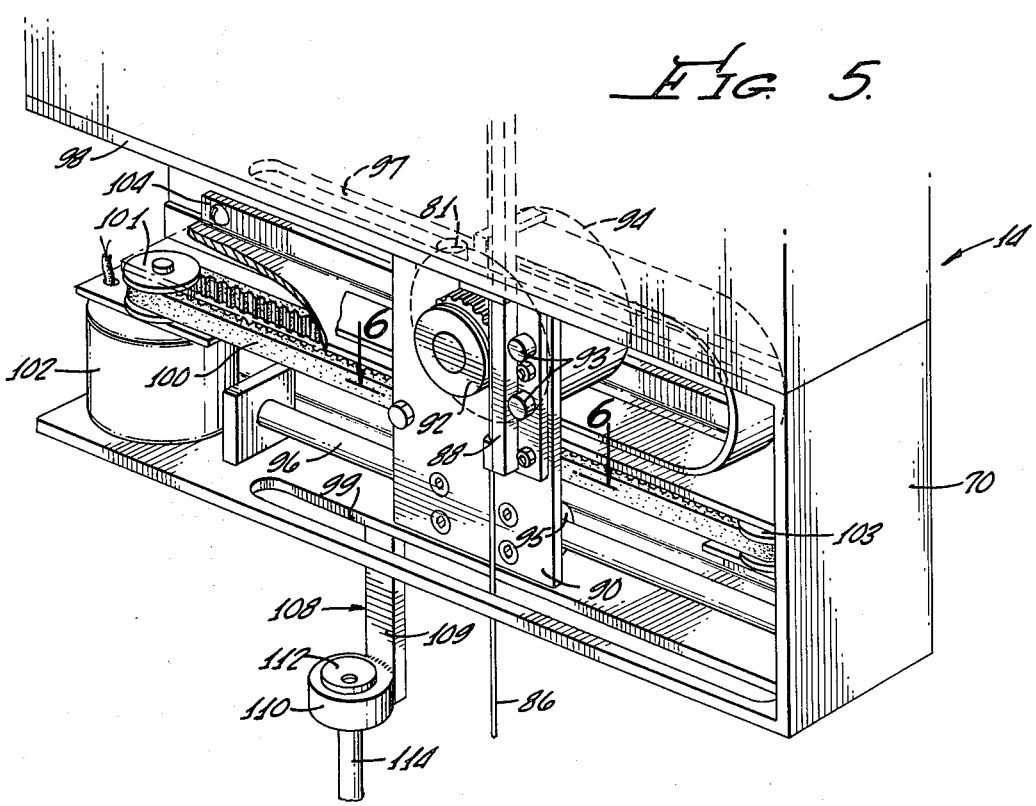
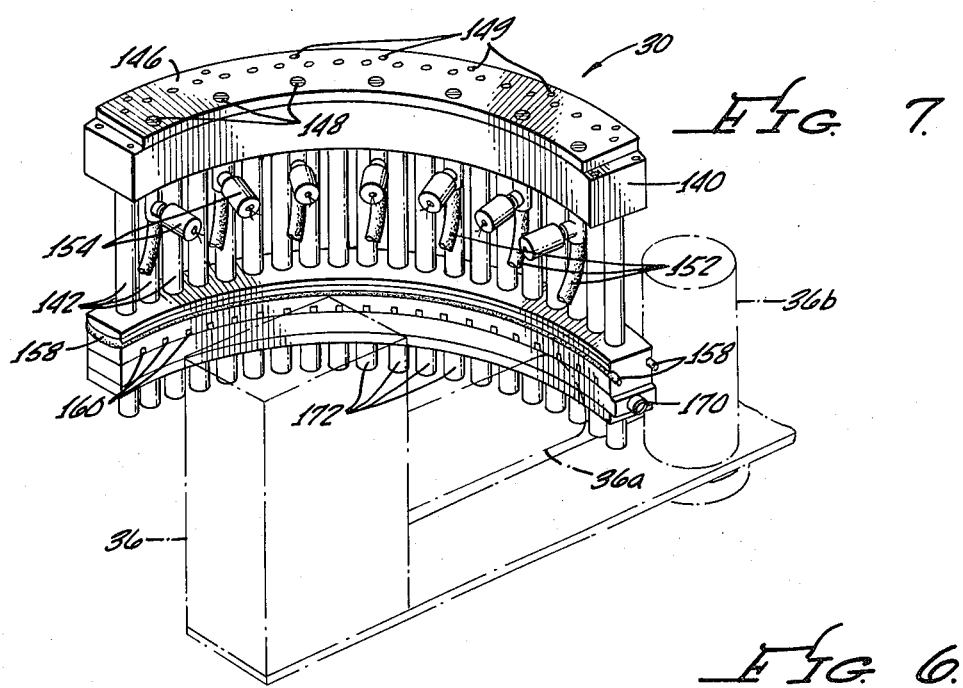
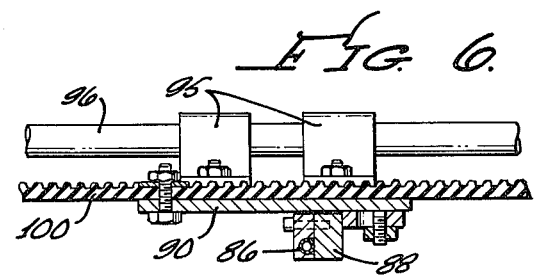

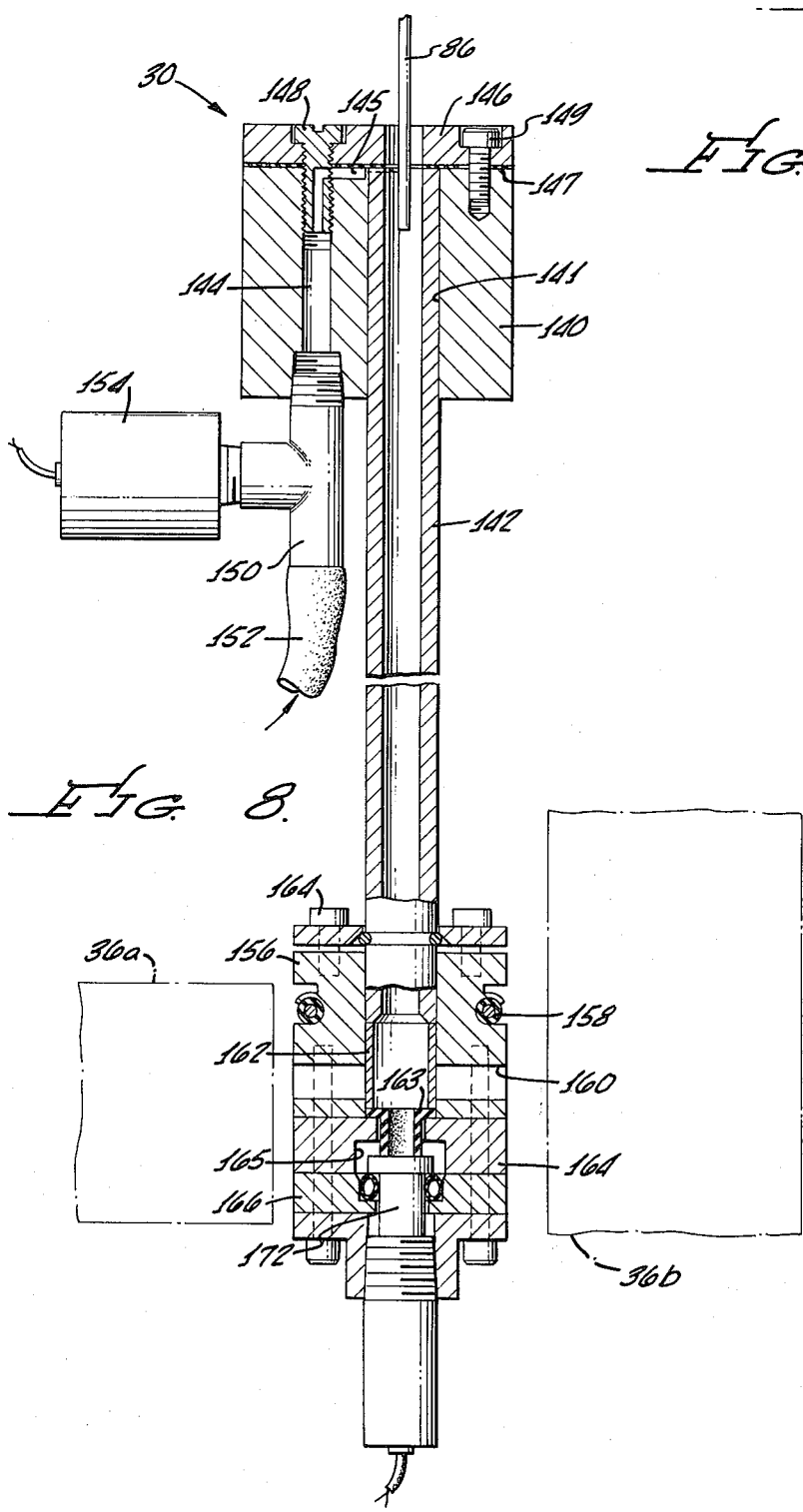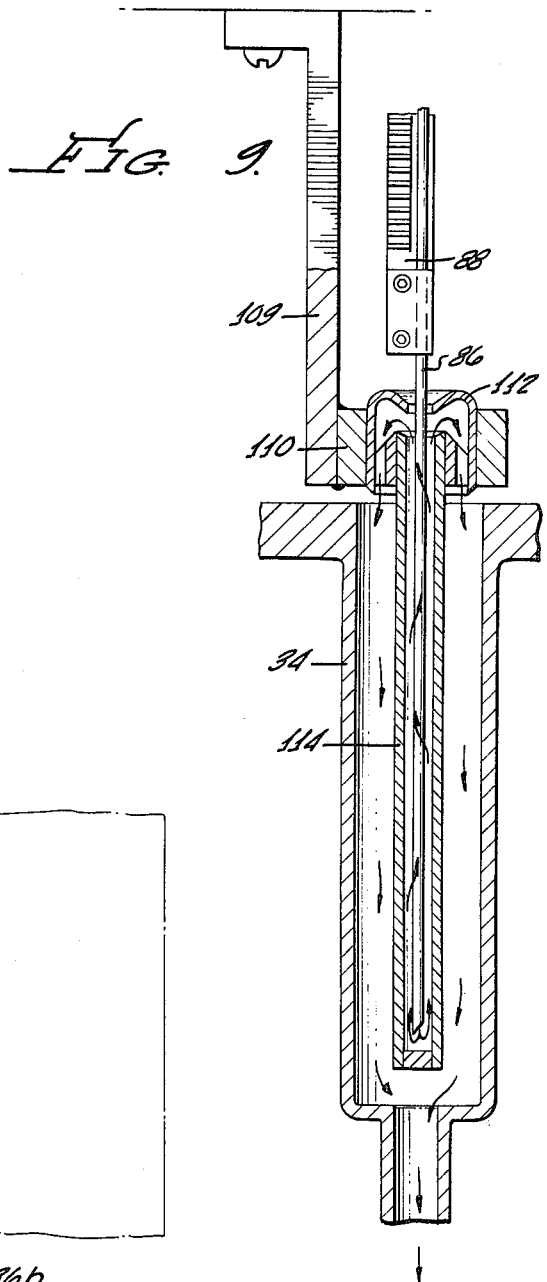
Fig. 8.
Fig. 9.

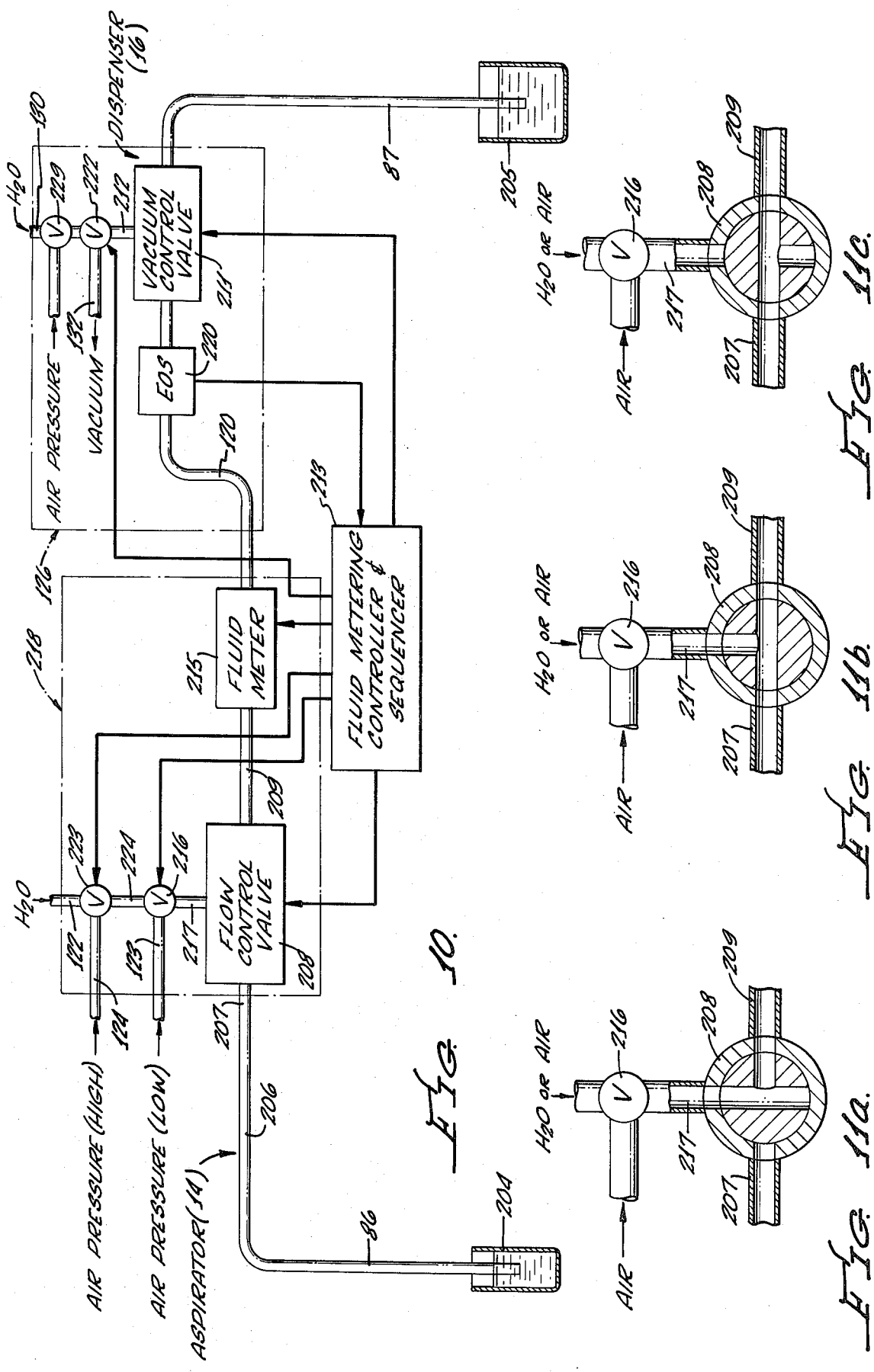

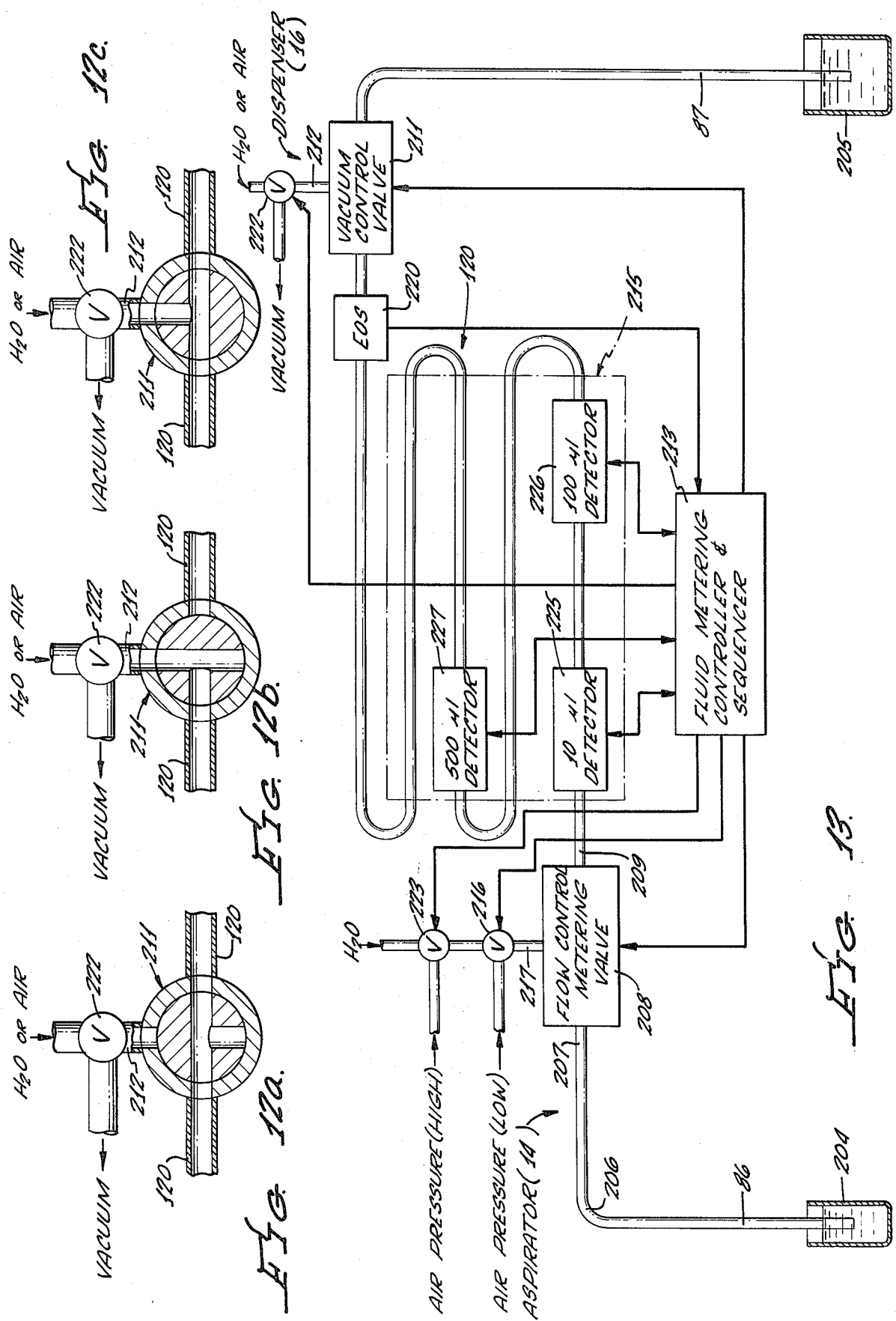

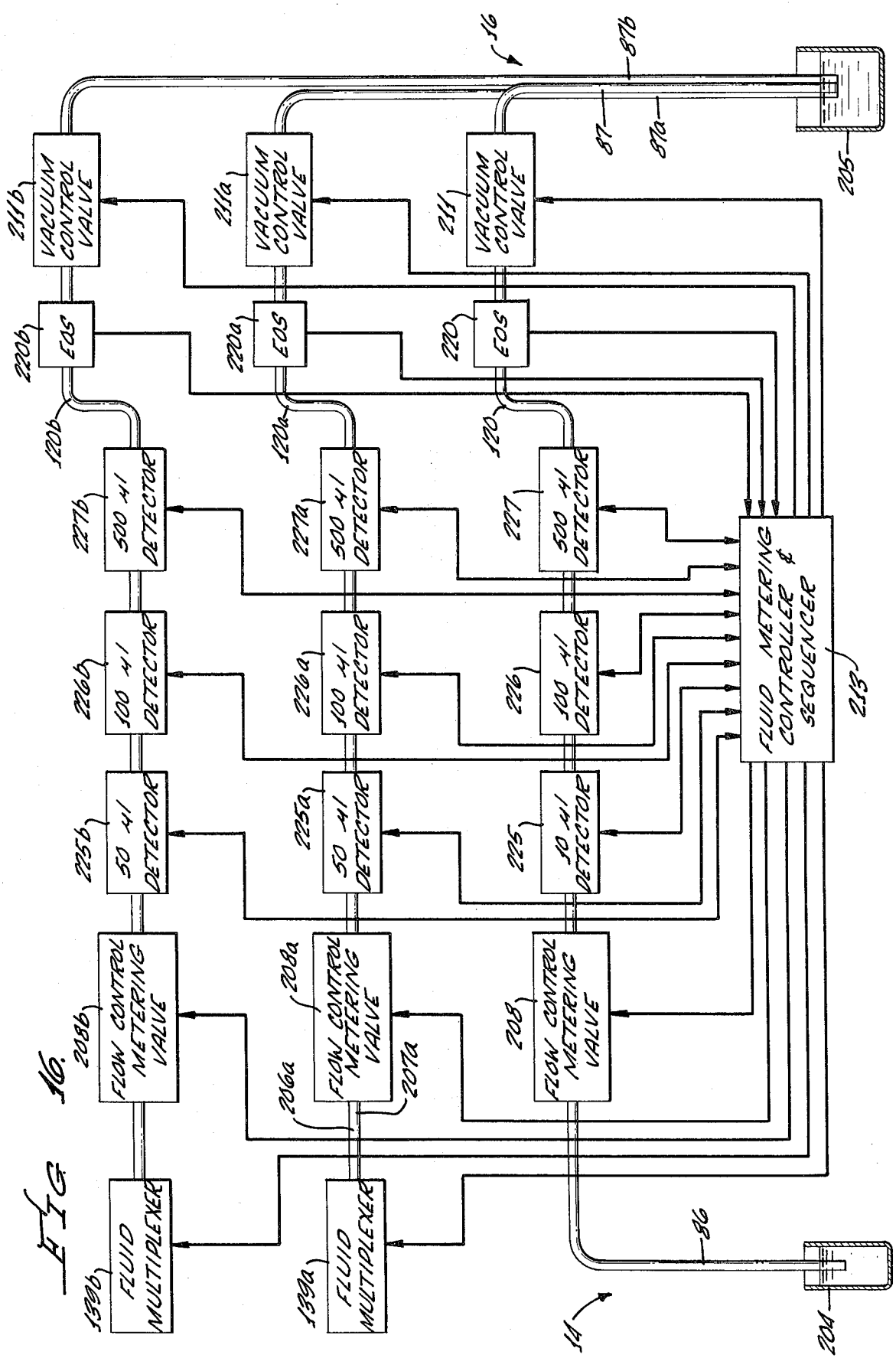

APPARATUS AND METHOD FOR AUTOMATIC CHEMICAL ANALYSIS

This invention relates to an improved apparatus and method for analyzing fluid such as blood or urine samples. For many years analysis of such specimens had been manually performed; however, more recently a wide variety of apparatus has been developed for automatically performing such functions.

In one prior art approach, specimens are serially moved past a testing station where samples of the specimen are withdrawn by a syringe type aspirator and then dispensed from the aspirator into a test container. Such arrangements often provide cleaning difficulties since the aspirator must be cleaned after each usage and the cleaning fluid does not pass through the equipment but merely moves, like the specimen fluid, partially into the aspirator and then is dispensed from the aspirator. Proper identification of samples is often another difficulty with such arrangements.

In another approach, small discrete samples of a specimen are drawn into a tube with samples from different specimens being separated in the tube merely by bubbles of a different fluid. Such an approach has advantages of speed but the possibilities of contaminating one specimen with another represents a significant shortcoming. Again identification of samples is often a problem.

In addition to the features of speed, easy and reliable identification of specimens, and prevention of contamination, it is desirable that automatic analyzer apparatus permit random positioning of specimens, selectivity with regard to tests to be conducted on individual specimens, and the capability to have overlapping tests and fluid movement being conducted simultaneously with other tests and movements. It is also highly desirable that automatic operation of the apparatus can be interrupted at any time to handle a rush operation. Of course it is mandatory that the equipment be highly reliable and that costs and maintanence be minimized so as to be more competitive.

In accordance with the arrangement discussed herein, the fluid specimens to be analyzed are given human readable and computer readable identification on the exterior of the specimen tubes as soon as the specimens are placed in the tubes. Preprinted test request forms are supplied which contain printed identification numbers with matching peel-off labels. Both the test request form and label are printed in character form for readability by personnel and in binary marking for readability by an optical reader. The labels are affixed to the vacutainer or specimen tube at the time of vein puncture. The patient's and the doctor's names plus the requested tests are then marked on the test request part of the form. The form is then separated from the sample specimen and read into a controller. Through the binary code, the reader is able to scan the specimen tubes inserted into the apparatus and match them to their appropriate cards. This arrangement is set forth and claimed in a separate U.S. patent application by Robert R. Young et al., entitled "Analysis System Having Random Identification and Labeling System", Ser. No. 447,941, filed concurrently with this application, and assigned to the same assignee.

In accordance with the arrangement in the present case, the optical reader is rotatably mounted on a support to be moved adjacent to the specimen tubes which are spaced outwardly from the support. An aspirator and a dispenser are also rotatably mounted on the support in a manner such that specimen fluid can be withdrawn from the specimen tubes by the aspirator. Fluid transfer means are provided for transferring fluid from the aspirator to the dispenser where the fluid is dispensed into mixing containers positioned outwardly from the support.

In a preferred form of the invention, the mixing tubes and the specimen tubes are supported in the plane of a horizontal support platform and the aspirator and dispenser extend above the platform while the optical reader rotates beneath the platform adjacent the sides of the specimen tubes. Also mounted to rotate beneath the platform with the optical reader is a spectrophotometer which moves adjacent the sides of cuvettes of detection tubes supported by the horizontal support platform. Specimens mixed with reagent are tranferred to the cuvettes by the aspirator and the dispenser.

Also included in the apparatus is means for storing a large quantity of different reagents to be mixed with the specimen fluids in performing the various tests desired. Fluid transfer and metering means connect the reagent supplies to the dispenser so that the desired quantities of the specified reagent as determined by the controller may be selectively dispensed into the mixing containers. The support on which the aspirator and dispenser are rotatably mounted is preferably in the form of a tube assembly and the lines or tubes for transmitting fluid to and from the aspirator and dispenser extend conveniently through the central tube assembly.

Included in the apparatus is means for washing and drying the aspirator and the dispenser as well as the mixing containers and the cuvettes. The washing functions like the obtaining of specimen fluid and reagent fluid is all performed automatically by the controller. Included as part of the washing system is an annular trough formed in the support platform in which is positioned wash arms which move with the aspirator and the dispenser. The aspirator cannula and the dispenser cannula are inserted into these wash tubes during the wash cycle so that their exteriors can be washed as well as their interiors. One of the primary advantages of the system is that specimen fluid is withdrawn by the aspirator and transferred to the dispenser as opposed to being dispensed out of the aspirator. Thus during the washing cycle the areas in contact with the specimens and the reagent can be completely flushed since the wash fluid goes completely through the tubing.

Further features and advantages of the invention may be understood by reference to the following drawings in which:

FIG. 3 is a side elevational somewhat schematic view of the analyzer;

FIG. 4 is an elevational, partially sectionalized view of the center tube assembly and the rotating dispenser and aspirator arms illustrating the construction of the center tube assembly and the manner in which the dispener and aspirator arms are movable;

FIG. 5 is a perspective partially schematic view of the aspirator arm illustrating the manner in which the aspirator cannula can be moved radially and vertically;

FIG. 6 is an enlarged fragmentary view of a portion of the structure of FIG. 5 showing the manner in which the aspirator cannula is moved radially;

FIG. 7 is a perspective view of a cuvette assembly and the manner in which the spectro-photometer cooperates with the cuvettes;

FIG. 8 is an enlarged cross-sectional view of one of the cuvette assemblies of FIG. 7;

FIG. 9 is a cross-sectional view of the dispenser cannula and wash tube on line 9—9 of FIG. 4;

FIG. 10 is a simplified block diagram of the fluid transport and metering system connecting the aspirator and dispenser;

Figure 14:
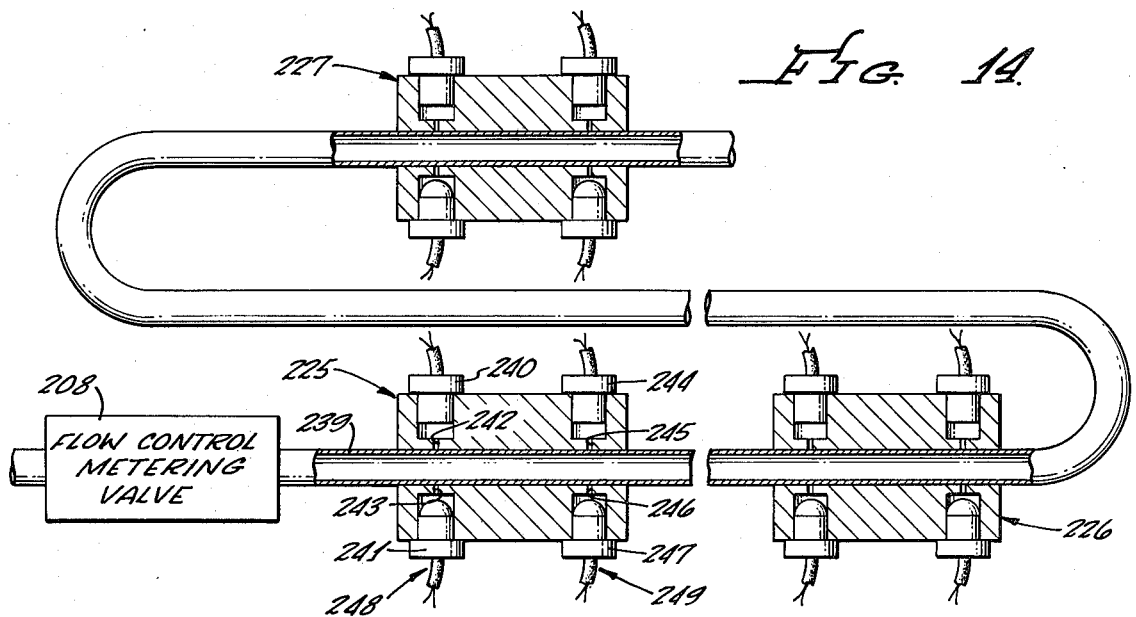
Figure 15:
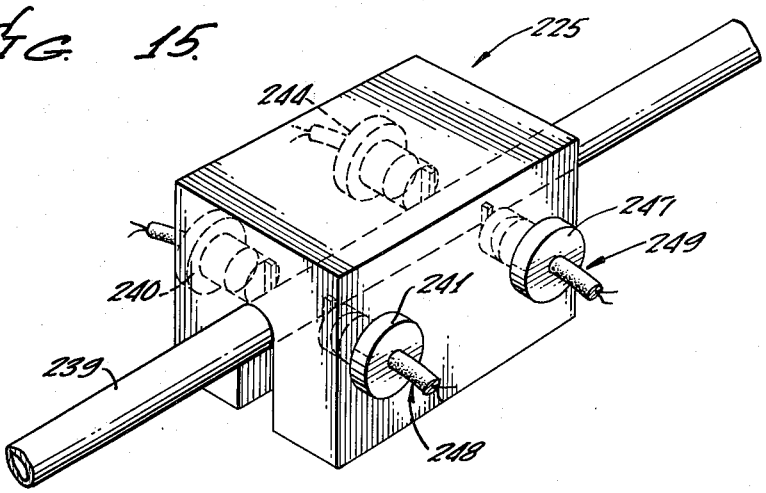

FIGS. 11a, 11b and 11c, respectively show schematically the flow control and metering valve in its closed, open-air/$H_2O$ open, and open-air/$H_2O$ closed positions;

FIGS. 12a, 12b and 12c, respectively show schematically the vacuum control valve in its closed, open-outlet closed, and open-outlet open positions;

FIG. 13 is another block diagram of the fluid transport and metering system showing further details of the fluid meter;

FIG. 14 is an elevation view of the fluid metering detectors included in the fluid metering system;

FIG. 15 is an orthogonal view of a fluid metering detector; and

FIG. 16 is a block diagram showing the systems for transporting and metering fluids from the multiple port fluid multplexers to the dispenser.

MAIN WORK AREA

Figure 1:
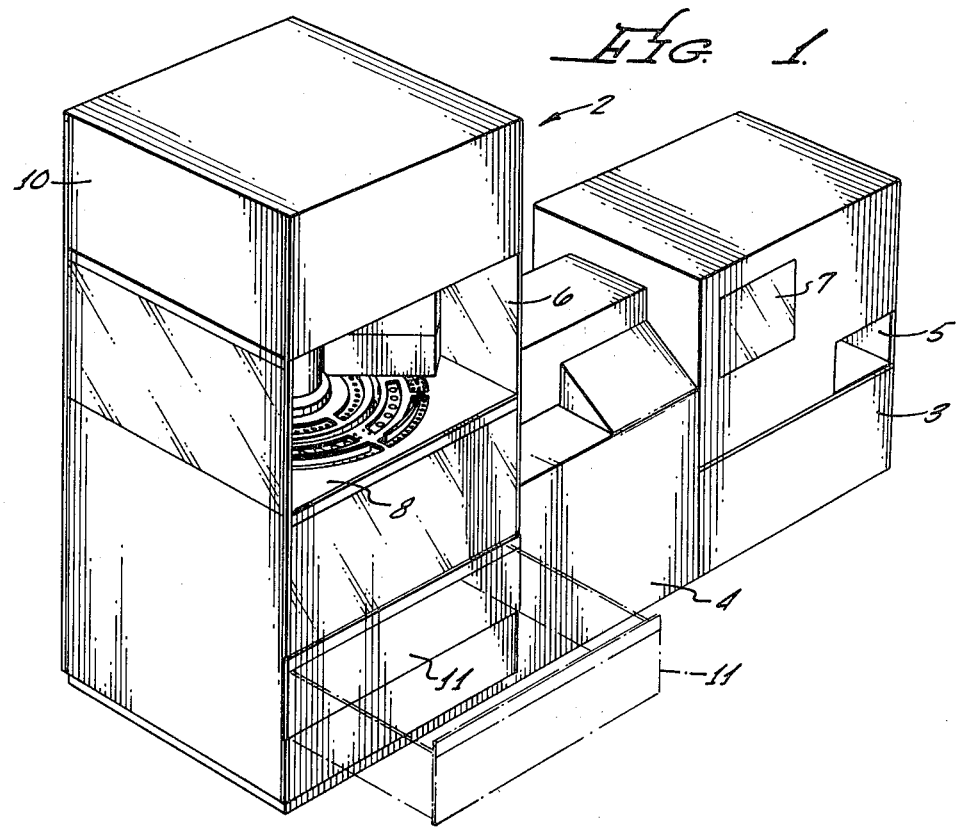
FIG. 1 is a perspective view of the overall apparatus of the invention.

Referring first to FIG. 1, the fluid handling apparatus of the invention is conveniently housed in a single cabinet 2 with a computer or controller 3 and teletype or other printer 4 positioned adjacent to the cabinet. The controller includes a card reader 5 and a CRT display 7. The card reader, the CRT and the teletype provide communication between the operator and the analyzer hardware, a general purpose digital computer within the controller providing sequencing and timing signals for control of the hardware in accordance with such communication.

Reagents for mixing with the specimens to be analyzed are conveniently stored in a drawer 11 slideably mounted in the lower portion of the cabinet 2. A center portion 6 of the cabinet encloses the main work area of the apparatus and is open on the front side for convenient access. A main support platform 8 horizontally extends in the center portion 6. The upper portion 10 of the cabinet houses the majority of the electronic control components of the apparatus, which are linked to the controller 3.

Figure 2:
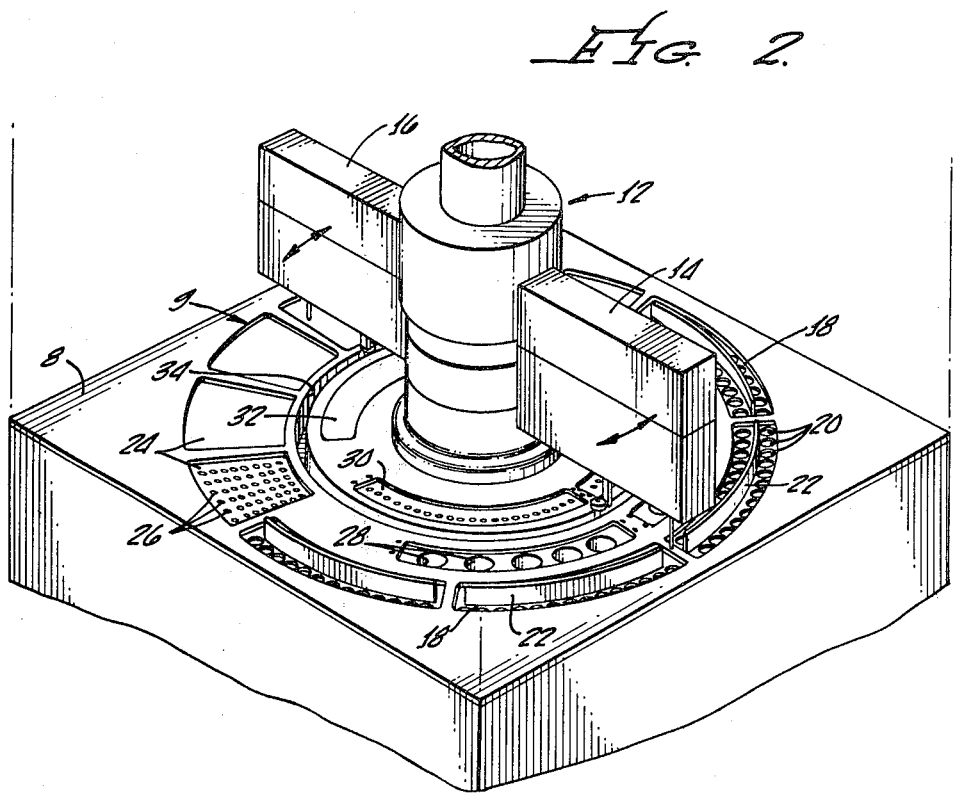
FIG. 2 is a perspective view of the main operating platform of the analyzer illustrating the manner in which the aspirator and dispenser arms can be moved.

Referring to FIGS. 2, 3 and 4, a vertically extending center tube assembly 12 is shown centrally supported on the platform 8. Rotatably mounted on the center tube assembly is an aspirator arm 14 and a dispenser arm 16 arranged so that they can be moved independently in either direction over a circular central section 9 of the platform 8. Contained in or on the circular section 9 are a variety of spaces or compartments accessible to the aspirator and dispenser arms. Four arcuate specimen tube receiving spaces 18 are formed in the platform extending circumferentially along the periphery of the section 9 over which the aspirator arm 14 moves. Within each space 18 there is provided means for supporting two parallel arcuate rows of specimen tubes 20. The open ends of the specimen tubes face upwardly so that the tubes are accessible to the aspirator arm 14, and the body of each tube hangs beneath the platform 8, as seen in FIGS. 3 and 4. A splash shield 22 extends arcuately and upwardly from the platform between the rows of tubes to minimize the possibility of contamination between the tubes of the two rows.

The balance of the outer periphery of the central section 9 has a plurality of spaces containing mixing and incubating cells 24, depending from the platform 8. Within each cell there is positioned a plurality of individual mixing and incubating tubes or containers 26, for receiving specimens transferred from the specimen tubes 20 where they are mixed with reagents dispensed into the containers 26.

Spaced inwardly from the specimen tubes 20 are a plurality of dilution chambers 28 which extend in an arcuate row depending from the platform 8. As with the specimen tubes 20 and the mixing containers 26, the upper ends of the dilution chambers 28 are open so as to be accessible to the aspirator and dispenser arms 14 and 16. Reagents which need diluting are placed in the chambers 28 where they are diluted with water or other suitable fluid and stored for future use.

Spaced inwardly from the dilution chambers 28 is an arcuate row of cuvette tubes 30 which are arranged in two assemblies depending from the platform 8. The upper ends of the cuvette tubes are open and accessible by the dispenser arm so that fluid from the mixing containers 26 can be easily transferred to the cuvette tubes. As can be seen, the cuvette tubes extend about 180° around the center tube assembly 12. Additional arcuate spaces 32 are formed in the platform 8 at about the same radius as the cuvette tubes. These spaces may be used for additional diagnostic equipment to be added to the apparatus.

Between the cuvette tubes 30 and the dilution chambers 28 is an annular wash trough 34 extending completely around the center tube assembly 12, as more clearly seen in FIG. 3.

CENTER TUBE ASSEMBLY

Also shown in FIG. 3 is a portion of the center tube assembly 12 extending below the platform 8 and a detection arm 35 rotatably mounted on the lower end of the center tube assembly. The detection arm includes a spectro-photometer 36 which moves adjacent the lower ends of the cuvette tubes. A radially extending bracket 37 attached to the spectro-photometer 36 supports an optical reader 38 which extends upwardly between the rows of specimen tubes 20 to read indicia marked on the specimen tubes, to be hereinafter described in greater detail.

Referring now to FIG. 4, the center tube assembly 12 includes a base ring 40 which fits within a mating aperture in the platform 8. A flange 40a on the base ring 40 engages the upper surface of the platform to support the assembly. Mounted on the upper end of the base ring 40 by suitable bearings 42 is a dispenser arm ring 44. Mounted on the top of this ring by suitable bearings 46 is an aspirator arm ring 48. A cap 50 is mounted by suitable bearings 52 on top of the aspirator arm ring 48. Positioned at the lower end of the base ring 40 beneath the platform 8 is a detection arm ring 54 rotatably mounted by suitable bearings 56. The various rings of the center tube assembly are held together by a rod 58 extending through the rings, a lower plate 60 is positioned within the lower ring 54 and is rotatably mounted by bearings 62 on the end of the rod 58. The head on the lower end of the rod engages the bearings 62 to limit the upward movement of the rod. The rings of the center tube assembly are axially held together by a nut 64 on the end of the rod, and a spring 66 surrounding the rod and extending between a washer 68 and the upper end of the cap 50 provide some resiliency for the mounting of the center tube assembly.

The aspirator arm 14 includes a housing 70 which is attached by a suitable bracket and bolt arrangement to the aspirator ring 48. The dispenser arm 16 is attached by similar means (not shown) to the dispenser ring 44. The aspirator arm ring 48 has gear teeth formed on its inner upper end which cooperate with a gear 72 mounted on the end of a shaft of a suitable step motor 74, which is supported on the cap 50 in the upper end of the center tube assembly 12. The dispenser arm ring 44 is similarly provided with gear teeth on its lower inner end which cooperate with a gear 75 mounted on the end of a shaft driven by a step motor 76 which is attached to a center support plate 78 within the tube assembly.

Similarly, a step motor 80 positioned within the base ring 40 of the tube assembly has an output gear 81 driving a reducing gear 82 which in turn drives a gear 83 which cooperates with teeth formed on the inner upper end of the detection arm ring 40 to drive that ring. A bracket or support ring 84 is attached by suitable fasteners 85 to the detection arm ring 54, and the bracket 84 is in turn attached to the spectro-photometer 36, thereby enabling it and the reader 38 to be rotated.

ASPIRATOR AND DISPENSER

Within the aspirator arm 14 there is supported an aspirating cannula 86 which is mounted by suitable means to be moved vertically, or on the so-called Z-axis, and to be moved radially, or the so-called R-axis. In the arrangement shown, the cannula is attached at its upper end to a rack 88 which is slideably mounted on a vertically extending support plate 90. The rack is held between a gear 92 and a pair of bearings 93 secured to the plate 90. The gear is mounted on a shaft extending from a step motor 94 also carried by the support plate 90. The lower end of the plate 90 is attached to a pair of linear bearings 95 as seen in FIG. 6 which are slideably mounted on a guide rail 96 extending radially with respect to the center tube assembly and suitably supported in the housing 70. The upper end of the support plate 90 is guided by a bearing 91 which extends into a guide slot 97 formed in a central support plate 98 in the housing 70. As best seen in FIG. 5, the cannula 86 extends through a slot 99 in the lower wall of the housing 70. The rack 88 on which the cannula is mounted can of course move upwardly into the upper portion of the aspirator arm as is illustrated in dotted lines in FIG. 4.

To provide radial movement of the cannula 86 the support plate 90 and the elements attached thereto are moved radially as a unit. This is accomplished by a belt 100 driven by a pulley 101 mounted on a step motor 102 supported on the bottom wall of the housing 70. The other end of the belt is supported on an idler 103 mounted in the radially outer end of the housing 70 on a flange 104 attached to the rear wall of the housing 70. The plate 90 is attached to the exterior side of the belt 100 so that as the belt 100 is driven by the motor 102 the plate 90 carrying the cannula 86 is moved radially.

The radial and vertical movement is illustrated by phantom lines in FIG. 4. Since the rack 90 is movable, it is necessary that the motor 94 be energized by a movable conductor. For this purpose there is provided a flat conductive member 105 shown in a loop in FIGS. 4 and 5. The conductor 105 is in turn connected to a suitable conductor extending through a hole leading to the center tube assembly along with the conductor for the motor 102 as may be seen in FIG. 4. These conductors may be conveniently connected to a power source through either end of the tube assembly 12.

The dispenser arm 16 is provided with a dispenser cannula 87 and with the means for moving the cannula and means for moving the cannula vertically and radially like the structure shown described for the aspirator arm.

To wash the exterior of the cannulas 86 and 87, there is provided for each a wash tube assembly 108 which as seen from FIGS. 3, 4 and 9 includes a bracket 109 attached to the lower wall of the housing 70 of the aspirator arm and carrying a collar 110 on its lower end. Within the collar 110 is a tubular sleeve 112 having a funnel shaped upper wall into which the cannula is inserted. A wash tube 114 having a smaller diameter than the sleeve 112 is supported in the collar 110 by a suitable spider support and depends into the wash trough 34. The wash tubes 114 move within the wash trough 34 as the aspirator and dispenser arms are rotated or pivoted.

FLUID SYSTEMS

Still referring to FIG. 4, the cannula 86 is connected to a flexible tube or aspirator line 206, which, is, in the arrangement shown, merely a continuation of the cannula 86. The line 206 in turn is connected to a schematically illustrated fluid transport and metering means 118. The tubing 206 is arranged in a loop to accommodate the radial and vertical movment of the aspirator 86. The fluid transfer and metering means 118 has four flexible tubes 120, 122, 123 and 124 connected thereto and extending downwardly through an aperture in the wall 98 and through an aperture in the wall of the aspirator arm ring 48 into the interior of the tube assembly 12. The line 120 is formed in a loop around the center rod 58 and extends outwardly through the dispenser arm ring 44 and is connected to a fluid transport and metering means 126 schematically illustrated in the upper portion of the dispenser arm 16. The line 120 transports fluid between the aspirator arm and the dispenser arm.

The tubing 122 conducts washing fluid to the fluid transfer and metering means 118 and the tubes 123 and 124 provide low and high pressurized air or other gas. These tubes also extend into the center tube assembly, where they extend downwardly through the tube assembly and exit through an opening 40b in the base ring 40 into the lower section of the cabinet. From there they are connected to suitable sources of water 127 and air 128 schematically illustrated in the lower portion of the cabinet in FIG. 3.

In addition to receiving the tubing 120 connected to the fluid transfer and metering means 126 in the dispenser arm 16, there is also provided a washing fluid tube 130 connected to the water source 127, a high pressure air line 129 connected to line 124, and a vacuum line 132 connected to a source of vacuum 133 located in the lower portion of the cabinet as illustrated in FIG. 3.

Also, there are shown connected to the dispenser meter means 126, two reagent tubes 134 and 136 which are connected to separate metering means 139 and a multi-port fluid multiplexer, or other suitable valve 135, one set of which is schematically shown in the reagent drawer in FIG. 3. The multiplexer valves 135 are in turn connected by suitable tubes, one of which is illustrated at 136 in FIG. 3, to the various reagent containers 138. A multiplexer valve 135 will on receiving an appropriate signal connect a selected reagent container to the line 134 or 136 carrying the reagent to the dispenser fluid transfer and metering means 126. The details of the multiplexer valve 135 are not disclosed in this application in that various arrangement may be employed. For example, if desired a separate solenoid valve could be provided for each reagent container. Further description of the fluid systems will be given under "Operation" below in connection with FIGS. 10-16.

Cuvette Assemblies

Refer now to FIGS. 7 and 8 for a more detailed description of the cuvette tubes 30 which are formed as a group in a curved row concentric with the center tube assembly 12. This includes a main upper block 140 having a row of bores 141 for receiving the upper end of tubing 142. On the inner side of the curved upper block there is formed a series of vertically extending passages 144 extending parallel to the bores 141. The upper end of the passage opens into a small manifold 145 which extends radially toward the main bore 141 in the upper block and also extends circumferentially to be in communication with the two adjacent bores. Thus a manifold 145 is provided for each group of three bores. The manifolds 145 are closed on their upper ends by a curved upper seal plate 146 and a gasket 147. The plate 146 is held in position by a plurality of bolts 148 threaded into the upper end of the passages 144 on the inner side of the upper block 140 and by a plurality of bolts 149 threaded into a series of threaded openings formed in the other side of the upper block 140. The lower ends of the bolts 148 are tubular or hollow as shown in FIG. 8 so that the passages 144 are in communication with the manifolds 145 and the bores 141.

A valve fitting 150 is threaded into the lower end of the passages 144 in the upper block 140. The fitting is connected to a wash line 152 and fluid flow through the passage is controlled by solenoid valve 154. The wash line 152 is connected to the suitable source of cleaning water 127 (FIG. 3) or other liquid and can be selectively connected to air source 128b or other fluid for drying purposes.

The lower end of the tubing 142 extends into a curved lower supporting block 156. An insulated electrical heating wire 158 extends along both the interior and exterior of the curved lower block 156 is a groove provided for this purpose, in the event it is desired to maintain as specified temperature of the specimens introduced to the cuvette tubes. In the lower end of the lower block 156 there are provided a series of bores or windows 160 that extend radially with respect to a curve of the lower block. Each window 160 intersects the lower end of the bore in the lower block 156. As may be seen from FIG. 8, the tubing 142 terminates upwardly from the windows 160, and in that area instead there is positioned a separate tubular cuvette 162 made of quartz. The quartz cuvette extends across the interior of the window passages 160. The lower end of the cuvette 162 engages the upper surface of the outwardly extending flange of a tubular valve seat 163, while the lower surface is pressed against a drain plate 164. The tubing 142 is urged axially into the block 156 by a lock ring 165 positioned in an annular groove in the tubing 142, a retainer 166 surrounding the tubing and engaging the lock ring, and a series of bolts 167 extending through the retainer 166 and into the block 156. The drain plate 164, a gasket 166, and a valve housing 168 are secured to the block 156 by a plurality of bolts 169, thus axially compressing the cuvette between the lower end of the tubing 162 and the valve seat 163, and urging the valve seat against the drain plate 164.

The drain plate 164 has a drain manifold 165 formed in its lower surface which is in communication with the lower end of each of the cuvettes 162 by means of the tubular valve seat 163 which extends into the drain plate 164. The drain manifold 165 is in turn connected to a suitable drain 170 at one end of a cuvette assembly as shown in FIG. 7. A solenoid valve 172 is provided to control drainage from each of the cuvettes. As may be seen, the solenoid is mounted in the valve housing, and its valve member 173 extends through the gasket 166 and into the drain plate manifold 165 and cooperates with the lower end of the valve seat 163.

The spectro-photometer 36 mounted to rotate about the center tube assembly 12 includes a transmitting head 136a and a receiving assembly 136b both of which are radially aligned to view the specimen positioned in the bottom of the cuvette 162 through the cuvette wall and the radial window 160 in the block 156. The details of the spectro-photometer are not disclosed in this document in that the principles are well known.

OPERATION

The fluid specimens to be analyzed are given human readable and computer readable identification on the exterior of the specimen tubes as soon as they are placed in the tubes. The method and apparatus used for this procedure forms the subject of a separate U.S. Pat. application Ser. No. 447,941, filed concurrently with this application and assigned to Anatronics Corporation, assignee of the present application. In brief the procedure is as follows. Preprinted test request forms (not shown) are supplied which will contain printed identification numbers with matching peel-off labels. Both the test request form and label are printed in character form for readability by personnel and in binary marking for readability by the optical reader 38. The labels are affixed to a vacutainer or specimen tube 20 at the time of vein puncture. The patient's and the doctor's names plus the requested tests are then marked on the test request part of the form. The form can now be separated from the sample specimen and read by the card reader 5 into the controller 3 at any time. Through the binary code, the optical reader 38 is able to scan the specimen tubes 20 inserted into the apparatus and match them to their appropriate cards. Since no information is placed on the card until the specimen sample is actually obtained, the chance for errors, for all practical purposes, is eliminated.

Thus, when the controller 3 is instructed to perform specified tests on a certain specimen, the reader 38 shown in FIG. 3 will scan the specimen tubes and identify the one which is to be tested. When the proper specimen is located, the motor 74 in FIG. 4 will drive the aspirator arm 14 in the proper direction to angularly align the aspirator arm 14 with the proper specimen tube 20. Simultaneously the step motor 102 is instructed to move the cannula assembly so that it is radially aligned with the identified specimen tube 20. The cannula 86 is then immersed into the specimen tube 20 as driven by the step motor 94 and the rack and gear arrangement 88 and 92. The aspirator and dispenser arms are independently movable. The controller 3 monitors the positions of the aspirator and dispenser arms 14 and 16 to prevent interference. Also, if desired, suitable limit switches (not shown) may be provided to prevent collisions between the arms.

While the aspirating cannula 86 is being moved to the proper specimen tube, the motor 76 and motors like 94 and 102 controlling the movement of the dispenser cannula 87 in the angular or θ, R and Z directions are aligning the dispenser cannula 87 with any empty mixing tube 26. The controller 3 will keep track of which mixing containers are empty and which are not. With the aspirator cannula 86 inserted into the proper specimen tube 20 and the dispenser cannula 87 inserted into a mixing container 26, the fluid transport and metering means 118 and 126 in the aspirator and dispenser arms are instructed to withdraw a measured amount of fluid from the speimen tube and dispense it into the mixing tube. The apparatus for accomplishing this is described below.

As a next step a measured quantity of a desired reagent is to be added to the specimen in the mixing container 26. Thus the reagent metering means 139 adjacent the metering valve 135 in conjunction with the fluid transport and metering means 126 in the dispenser arm is instructed to perform this function.

After this operation it is necessary that the tubing which has been in contact with the specimen or with the reagent must be washed before a new specimen is to be analyzed. Thus the aspirator and dispenser arms are instructed to move their respective cannulas 86 and 87 to be aligned with and inserted into the wash tubes 114. The fluid transport and metering means 118 and 126 are then instructed to draw water from the water container 127 in the lower part of the cabinet and to flush water through the tubing 120 between the dispenser and aspirator arms, the tubing 116 and the cannula 86 in the aspirator arm and the tubing 117 and the cannula 86 in the aspirator arm and the tubing 117 and the cannula 87 in the dispenser arm. The water passing outwardly through the cannulas in the bottom of the wash tube 114, as shown by the arrows in FIG. 9, flows upwardly around the exterior of the cannulus thus washing both the interior and the exterior. The water then flows downwardly into the wash trough and out the bottom of the trough to drain. Simulatneously water is flushed through the reagent lines 134 and 136 back to the fluid multiplexer 135 which also has a suitable connection to drain. As indicated above the details of the fluid multiplexer are not shown but a variety of arrangements could be used, such as a separate solenoid control valve connected to drain. After the wash operation, drying air is introduced in the same manner as the water form the air source 128b, shown in FIG. 3.

While the dispenser and aspirator fluid lines are being cleaned, the first specimen and its reagent or reagents are being mixed at a desired temperature for a desired period of time in the mixing end incubation container. When the incubation period of time is complete, the aspirator arm and its cannula will be instructed to be inserted into the mixing and incubation container to withdraw the test fluid and transfer it to an empty cuvette 30. The aspirator and dispenser cannulas and the associated tubing is of course then washed again. While this is occurring, however, the spectro-photometer which is separately rotatable on the center tube assembly 12 is instructed to move to the position to observe through the window 160 the specimen in the selective cuvette. The information obtained by the spectrophotometer is automatically transmitted to a readout for the particular patient. The controller has of course kept track of the specification as it was transferred from the mixing container 26 to the cuvette tube 142.

As explained above three of the cuvettes are interconnected so that they can be washed as a group after three have been used. Thus, after the proper signal from the controller 3, the solenoid valve 154 shown in FIG. 8 is operated to apply a wash fluid to the cuvette through the wash line 152. Simultaneously the solenoid drain valve 172 is operated to allow the water to drain from the cuvette. After the washing operation, drying air is injected through the solenoid control valve 154. Similarly, the mixing containers 26 can be washed and dried as a group, upon proper signal from the controller.

If a particular reagent should be diluted for a particular test, the dispensing cannula 87 is simply instructed to be moved to one of the dilution cups 28 and the proper amount of reagent is automatically dispensed into the dilution cup and a measured amount of water or other diluent may be added to the dilution cup. The controller 3 will of course keep track of which diluted reagents are prepared, how much is used and which is in which cup and at the appropriate time the dilution cup may be emptied to drain and washed by water circulated or injected into the top of the cup through nozzle 182 schematically shown in FIG. 3.

FLUID TRANSPORT AND METERING SYSTEM

The fluid transport and metering system between the aspirator 14 and dispenser 16 is advantageously constructed in accordance with the invention disclosed and claimed in the copending application of Patrick L. Randleman et al, entitled "Fluid Transport and Metering System", filed herewith, Ser. No. 447,959 and assigned to Anatronics Corporation, assignee of the present invention. Referring to the schematic illustration of FIG. 10, this fluid transport system includes generally the aspirator 14 including the aspirating cannula 86 and the dispenser 16 including the dispensing cannula 87, and the fluid transport and metering means 116 and 126. Initially, the aspirating cannula 86 is selectively positioned and immersed in the container 204 form which fluid is to be withdrawn, in the manner described above. As explained above the aspirating cannula 86 may be positioned to withdraw fluid from any of the sample specimen tubes 20, any of the dilution cups 28, or any of the mix and incubator containers 26, container 204 symbolizing any of these separate receptacles. Similarly, the dispensing cannula 87 is selectively positioned by the dispenser arm 16 to and inserted in container 205 to which fluid is to be dispensed, this container thus symbolizing the mix and incubation containers 20, and the cuvette tubes 30. Aspirator cannula 86 is connected by a conduit 206 to the inlet port 207 of a flow control metering valve 208. The outlet port 209 of valve 208 is in turn connected by a continuous conduit 120 through a downstream vacuum control valve 211 to the dispensing cannula 87.

Initially, the flow control metering valve 208 and vacuum control valve 211 are in their closed positions, schematically illustrated in FIGS. 11a and 12a. As shown therein, when valves 208 and 211 are in their closed positions, fluid is prevented from passing between its inlet and outlet ports 207, 209 and the vacuum at inlet 212 is disconnected from conduit 210.

To withdraw fluid from container 204, fluid metering controller and sequencer 213 actuates (i) the flow control valve 208 to its open-air/$H_2O$ closed position (shown schematically in FIG. 11c), (ii) two-way valve 222 to connect the vacuum inlet to the inlet 212 of the vacuum control valve 21, and (iii) vacuum control valve to its open-outlet closed postion (shown schematically in FIG. 12b). As a result, a vacuum is applied through the inlet 212 of vacuum control valve 211 through conduit 120 and flow control valve 208 to aspirating cannula 86. A preselected volume of fluid is then withdrawn from the container 204 through the aspirating cannula 86, conduit 206, valve inlet port 207, flow control valve 208, and valve outlet port 209 to the input of a fluid meter 215. As described in more detail below, fluid meter 215 detects the leading meniscus of the front of the fluid within conduit 210 and supplies an electrical signal to controller and sequencer 213 automatically closing flow control metering valve 208, then entrapping a known volume of fluid (described hereinafter as a fluid slug) in the conduit 120 between the flow control valve 208 and fluid meter 215.

The fluid slug thus formed is transported over the remainder of conduit 120 to the dispensing cannula 87 by applying air under pressure at the back or trailing meniscus of the fluid slug while continuing to apply the vacuum upon its leading meniscus. Sequencer 213 causes the requisite air pressure to be supplied by actuating two-way valve 216 to deliver low air pressure through air/$H_2O$ inlet port 217 of flow control valve 208 to the valve outlet port 209. As a result, a slug of fluid is formed by the dual action of the fluid meter 215 and flow control valve 208 and then transported through the conduit 120 by a push and pull action provided by the vacuum applied on the leading meniscus of the fluid slug and low pressure air on the trailing meniscus of the fluid slug.

As described below, the fluid meter 215 advantageously produces a series of fluid slugs each containing a precisely metered volume of fluid. In this manner, a predetermined extremely accurate volume of fluid is measured and transpotred from the aspirator 14 to the dispenser 16.

The lead meniscus of the lead fluid slug so produced will eventually reach the EOS or end of slug detector 220 at which time a signal is supplied to controller 213 resulting in closure of the vacuum control valve 211. At the same time, the air pressure is advantageously increased at the air/$H_2O$ inlet port 217 of flow control valve 208 by actuating two-way valves 223 and 216 to supply the high pressure air on tube 224 to the air/$H_2O$ outlet port 217 of flow control valve 208 to blow out the slug through the dispensing cannula 87 into the selected discharge container 205.

As mentioned above a significant feature of the present invention is that it provides a thorough wash system within the fluid dispensing system for completely cleaning the transport after each aspirator and dispense operation. In this manner, contamination between successive fluid transports is avoided. The wash sequence is initiated by positioning both the aspirating cannula 86 and the dispensing cannula 87 into the wash tubes 114 (FIG. 4). Two-way valves 216 and 223 are then actuated by sequencer 213 to supply water or other cleaning fluid to the air/$H_2O$ inlet 217 of the control valve 208. This latter valve is actuated to its open-air/$H_2O$ open position. Sequencer 213 also actuates vacuum control valve 211 to its open-outlet open position (shown schematically in FIG. 12c) and two-way control valves 222 and 229 to supply water or other cleaning fluid to the vacuum/$H_2O$ inlet port 212. As shown schematically in FIG. 11b and described in more detail in the copending application entitled "Fluid Transport and Metering System", identified hereinabove, the flow control valve is constructed such that this valve when in its open-air/$H_2O$ open position permits flowing water from the port 217 through both the fluid inlet 207 (in a reverse flow path) and outlet port 209, thereby washing the aspirating cannula 86, the entire length of fluid conduit 120 and dispensing cannula 87. Any portion of the vacuum control valve which came in contact with the fluid previously transported is thoroughly washed by virtue of the water flowing through its vacuum/$H_2O$ inlet port 212 and out through the dispensing cannula 203. After a thorough washing, e.g. flowing 10 or more times the volume of water through the system than the fluid just previously transported, the two-way valves 223 and 229 are actuated to supply drying air under pressure to respective inlets 217 and 212 of flow control metering valve 208 and vacuum control valve 211. This air will flow through the entire system and out through the aspirating cannula 201 and dispensing cannula 203. After a short interval, the flow control valve 208 may close to divert all of the drying air through conduit 210 to the dispensing cannula 203. After another short interval, both flow control and vaccum control valves 208 and 211 are actuated to their closed positions and the system is ready for a subsequent fluid transport and metering operation.

The manner in which the fluid meter 215 of the copending application entitled Fluid Transport and Metering System identified hereinabove, provides for the precise metering of a preselected volume of fluid is further illustrated in FIG. 13. As shown, three metering detectors 225, 226 and 227 each coupled to fluid metering controller 228 are longitudinally positioned along the conduit 120. Each metering detector is adapted to form a slug of increasing known volume. In the particular example shown, the first metering detector 225 produces slugs of 10 microliters; the second metering detector 226 produces slugs of 100 microliters; and the third metering detector 227 produces slugs of 500 microliters in volume. In addition, the system provides for a sufficient fluid volume between the third metering detector 227 and the end of slug detector 220 such that a precise amount of measured fluid made up of a series of slugs of known value may be ultimately dispensed through the dispensing cannula 203.

If, for example, it is desired to precisely dispense 1660 microliters from container 205, three 500 microliters; one 100 microliters; and six 10 microliters slugs are successively produced as follows: The predetermined value of 1660 microliters is pre-set at the fluid metering controller and sequencer 213. The third metering detector 227 is physically located downstream from the flow control valve 208 a distance such that when it detects the passage of the lead meniscus of a slug and automatically closes off the flow control valve, a precisely measured 500 microliters of fluid is then entrapped in the conduit 210 after the flow control valve 208. As described above, this slug is transported in a push and pull manner by mutual application of vacuum through the vacuum control valve 211 and air under pressure through the air/H$_2$O inlet port 217 of the flow control valve 208. Metering detector 227 detects when the trailing meniscus of this slug passes through it and supplies a corresponding electrical signal to fluid metering controller and sequencer 213 which in turn signals the flow control valve to reopen to its open-air/H$_2$O closed position thus permitting fluid to flow from the aspirating cannula through the flow control valve 208. The lead meniscus of this fluid flow is detected by the 500 microliter metering detector 227 in the same manner as before, at which time the flow control valve is once again closed and air injected to transport this second slug through the metering detector. In this hypothetical example, there will then be three 500 microliter slugs of fluid in the conduit 120 between the metering detector 227 and the end of slug detector 220. Fluid metering controller 213 then responds to electrical signals produced by the second metering detector 226 to produce in a similar manner one slug containing 100 microliters of fluid. Lastly, the controller 213 responds to signals produced by the first metering detector 225 to produce six slugs of fluid each containing 10 microliters. These 10 slugs of fluid are transported through conduit 120 until the lead meniscus of the first 500 microliter slug reaches the end of slug detector 220, following which the vacuum is turned off and all of the slugs blown out of the dispensing cannula 87 in the manner described above.

A detailed illustration of the metering system described above is shown in FIGS. 14 and 15. That portion of the fluid transport conduit 120 from the flow control valve 208 to the metering detectors comprises a transparent tube 239 advantageously formed of quartz so as to minimize volumetric changes between the valve 208 and detectors 225, 226 and 227. As shown, detector 225 includes a first radiation source 240 and corresponding first radiation responsive detector 241 mounted on opposite sides of the tube 239. A narrow slit 242 located between source 240 and the tube 239 directs a narrow beam of energy through a corresponding slit 243 located between the opposite side of the tube and detector 241. A second radiation source 224, narrow slits 245 and 246, and second radiation responsive detector are longidutinally spaced along the quartz tube a predetermined distance from the first energy source and detector. Excellent results have been achieved by providing sources 240, 244 as infrared light sources and detectors 241, 247 as infrared detectors thereby minimizing interference from light in the visual spectrum. When the tube 239 is either empty or full of a fluid transparent to infrared radiation, the sources 240, 241 direct narrow slits of radiation through both the tube and the opposing slits onto the detectors 241, 247. When, however, a fluid meniscus is juxtaposed the slits 242, 243 or 245, 246, the light beam is distorted so as to interrupt or substantially reduce the amount of radiation reaching the detector. This interruption or reduction of radiant energy causes a corresponding interruption or reduction of current at the output of the detector. The resultant electrical pulses on the output leads 248 and 249 of radiation detectors 241, 247 are employed for controlling operation of the flow control valve 208.

Detectors 226 and 227 may be constructed in a similar manner so that each includes a pair of spaced radiation sources and a pair of spaced radiation detectors. As is described in detail in the copending application entitled Fluid Transport and Metering System identified hereinabove, the spaced radiation detectors in each of these detectors produces an electrical signal proportional to the velocity of the fluid meniscus as it passes through the detector. This signal is in turn used as a proportional control signal for the flow control valve 208 so as to compensate for the different flow characteristics of the fluids.

In addition to the metering detectors included in the conduit connecting the aspirator 14 with the dispenser 16, a similar fluid meter system is advantageously used to transport the fluids between the multiport fluid multiplexers 139a and 139b and the dispenser 16. Thus, as shown in FIG. 16, fluid multiplexer 139a is connected by a conduit 206a to the inlet port 297a of the flow control metering valve 208a. The outlet port in this valve is connected by conduit 120a through the respective metering detectors 225a, 226a and 227a through the end of slug detector 220a and vacuum control valve 211a to a second dispensing cannula 87a. In a like manner, the second fluid multiplexer 139b is connected to a third dispensing cannula 87b through a fluid transport and metering system including flow control metering valve 208b, metering detectors 225b, 226b and 227b, conduit 120b, end of slug conduit 220b and vacuum control valve 211b. The flow control metering valve 208a and 208b and their associated two-way air, water and vacuum control valves (not shown in this figure for sake of simplicity but corresponding to the two-way valves 216, 223, 222 and 229 of FIG. 10) are operated in the manner described above to dispense predetermined volumes of liquid through the dispensing cannula form the fluid multiplexers under control of the fluid metering controller and sequencer 213 followed by a wash and dry sequence.

What is claimed is:

1. Apparatus for chemically analyzing a plurality of individual fluid specimens comprising:
    a center support assembly;
    means for supporting a plurality of randomly positioned specimen tubes spaced outwardly from the center support assembly;
    a plurality of mixing containers spaced outwardly from the support assembly;
    aspirator means rotatably mounted on and extending outwardly from said center support assembly including means selectively movable into and out of said specimen tubes to extract fluid from the tubes;
    dispenser means rotatably mounted on and extending outwardly from said center support assembly including means selectively movable into and out of position to dispense fluid into said mixing containers;

fluid transfer means extending between said aspirator means and said dispenser means for enabling a measured quantity of fluid to be selectively withdrawn from said specimen tubes and selectively dispensed into said mixing container; and means for automatically rotation said aspirator means and said dispenser means to be aligned selectively with said tubes and containers.

2. The apparatus of claim 1 including a reader rotatably mounted on said center support assembly at a location to move adjacent to the sides of said specimen tubes to read identifying data on the tube.

3. The apparatus of claim 1 including a plurality of upwardly opening inspection containers positioned beneath said arms with their open ends accessible for receiving fluid from the mixing containers as transferred by the aspirator and dispenser arms, analyzer means movably mounted on said tube assembly adjacent said inspection container to analyze characteristics of the fluid.

4. The apparatus of claim 1 including a fluid analyzer means rotatably mounted on said support assembly to move adjacent specimens to be analyzed.

5. The apparatus of claim 1 including means for automatically cleaning said containers, said aspirator and dispenser means and said fluid transfer and metering means so that the specimens do not contaminate each other.

6. Apparatus for chemically analyzing a plurality of individual fluid specimens comprising:

a vertical extending support;

aspirator means rotatably mounted on and extending outwardly from said support including an aspirator cannula which is radially and vertically movable;

dispenser means rotatably mounted on and extending outwardly from said support including a dispenser cannula which is radially and vertically movable;

means for supporting a plurality of randomly positioned specimen tubes accessible by said aspirator cannula;

a plurality of mixing containers accessible by said dispenser cannula;

means extending between said cannulas for transferring fluid; and means for automatically rotating said aspirator means and said dispenser means to be aligned selectively with said tubes and containers.

7. Apparatus for chemically analyzing a plurality of individual fluid specimens comprising:

a generally horizontal support platform;

a vertically extending center tube assembly mounted on said platform;

means for supporting a plurality of specimen tubes extending below the platform with their open upper ends accessible from above the platform and arranged in an arcuate row concentrically about said center tube assembly;

a plurality of upwardly opening mixing containers extending beneath the platform with their open ends accessible from above the platform;

means for storing reagents to be mixed with the fluid specimens to be analyzed;

an aspirator arm rotatably mounted on and extending radially outwardly from said center tube assembly above said platform;

an aspirator cannula depending from said aspirator arm;

a dispenser arm rotatably mounted on and extending radially outwardly from said center tube assembly adjacent said aspirator arm;

a dispenser cannula depending from said dispenser arm;

means for pivoting the aspirator and dispenser arms about the tube assembly and means for radially and vertically moving said cannulas separately from said arms;

fluid transfer and metering means extending between said cannulas and through the aspirator and dispenser arms and through the tube assembly for enabling a measured quantity of fluid to be withdrawn from said test tubes and dispensed into said mixing containers; and fluid transfer and metering means extending between said dispenser cannula and said reagent storing means for transferring measured quantities of reagents to said mixing containers.

8. The apparatus of claim 7 including an optical reader rotatably mounted on said center tube assembly beneath said platform so as to be movable in an arc adjacent the sides of said specimen tubes so as to read indicia on the tubes identifying specimens in the tubes, said reader being connected to means for controlling movement and operation of said dispenser and aspirator arms and said fluid transfer means.

9. The apparatus of claim 7 including a plurality of upwardly opening detection containers positioned beneath the platform with their open ends accessible from above the platform for receiving fluid from the mixing containers as transferred by the aspirator and dispenser arms, each of said detection containers having an observation window in its side wall, analyzer means mounted on said tube assembly to rotate with said reader for viewing fluid in said detection container by way of said window.

10. The apparatus of claim 7 including means for automatically cleaning said containers, said cannulas and said fluid transfer and metering means so that the specimens do not contaminate each other.

11. The apparatus of claim 10 wherein said cleaning means includes:

a source of cleaning fluid;

fluid transfer means connecting the source of cleaning fluid to said fluid transfer and metering means in said aspirator and dispenser arms;

a wash trough in said platform opening upwardly to the top side of the platform and having its lower end connected to drain; and a wash tube depending from the aspirator arm aligned with the wash trough and a wash tube depending from the dispenser arm aligned with the wash trough, said wash tubes being sized to respectively receive said aspirator and dispenser cannulas to direct cleaning fluid around the exterior of the cannulas.

12. Apparatus for chemically analyzing a plurality of fluid specimens comprising:

a support assembly;

an aspirator arm and a dispenser arm each independently rotatably mounted on said assembly to be movable a substantial arcuate distance around said support assembly and extending radially outwardly from the assembly to transport said specimens; and means for automatically rotating said arms on a selective basis to transport randomly positioned specimens.

13. The apparatus of claim 12 including a detection arm rotatably mounted on said assembly including means thereon for reading indicia on containers for said specimens.

14. The apparatus of claim 13 including means on said detection arm for optically analyzing said specimens.

15. The apparatus of claim 12 wherein said support assembly is tubular, with each of said arms being separately attached to rotatably mounted rings forming a part of the support assembly.

16. The apparatus of claim 15 wherein said means for rotating said arms includes motor means mounted in said assembly for driving said rings.

17. The apparatus of claim 12 wherein said support assembly is tubular and including fluid transport means extending between said aspirator and dispenser arms and through said tubular support assembly.

18. In apparatus for chemically analyzing a plurality of fluid specimens comprising:
   means for supporting a plurality of specimen containers in an arc; and
   an optical reader rotatably mounted to move in an arc adjacent said containers to read identifying data on the tube.

19. The apparatus of claim 18 including:
   a center support assembly on which said reader is mounted; and
   means rotatably mounted on said support for aspirating fluid from said containers.

20. In apparatus for chemically analyzing a plurality of different fluid specimens having an aspirator cannula for selective insertion into said specimens:
   a wash tube having a closed lower end and an open upper end for receiving said cannula, said tube being slightly larger than the cannula;
   means for forcing cleaning fluid out of said cannula and into said wash tube to flush and clean both the interior and exterior of the cannula; and
   a movable aspirator arm on which said cannula is movably mounted, said wash tube being supported on said arm in a manner such that the cannula may be axially aligned with the wash tube and then inserted into the tube.

21. The apparatus of claim 20 including:
   a central support assembly on which said aspirator arm is rotatably mounted;
   a platform supporting said support assembly and a plurality of containers from which fluid is withdrawn by said aspirator; and
   a wash trough in said platform in which said wash tube moves as the aspirator arm is rotated.

22. In a system of transporting a plurality of different specimens having a dispenser cannula and an aspirator cannula joined by a tube, a method of cleaning the tube and the cannula comprising injecting cleaning fluid into said tube so that the fluid flows out of both cannulas.

23. A method of handling a plurality of liquid specimens comprising the steps of:
   placing the specimens in containers and positioning the containers around a center support assembly with their open ends opening upwardly;
   rotating an aspirator cannula rotatably mounted on the support assembly to be aligned with a selected one of said containers and inserting the cannula into the containers;
   rotating a dispensing cannula rotatably mounted on the support assembly to alignment with a mixing container; and
   withdrawing a quantity of liquid from the specimen container through the aspirator cannula and transferring the liquid to the mixing container through a tube connecting the cannulas to the dispenser cannula and into the mixing container.

24. The method of claim 23 including metering a quantity of reagent to said container through said dispenser cannula.

25. The method of claim 23 including the steps of cleaning said cannulas comprising:
   moving the cannulas to a drain area and simultaneously applying washing fluid to the interior and exterior of the cannulas.

26. Apparatus for chemically analyzing a plurality of individual fluid specimens comprising:
   a center support assembly;
   fixed means for supporting a plurality of randomly positioned specimen tubes spaced outwardly from the center support assembly;
   a plurality of fixed mixing containers spaced outwardly from the support assembly;
   aspirator and dispenser means rotatably mounted on said center support to be movable a substantial distance around said center support to extract fluid from the tubes and to dispense fluid into said mixing containers; and
   means for automatically rotating said aspirator and dispenser means to be aligned selectively with said tubes and containers so as to withdraw and dispense specimen fluids.

* * * * *